Patented Sept. 21, 1943

2,330,098

UNITED STATES PATENT OFFICE 2,330,098

HYDROGENATING CATALYST

Rhea Watts, Baton Rouge, La., assignor to Standard Catalytic Company

No Drawing. Application June 13, 1941,
Serial No. 397,871

5 Claims. (Cl. 252—251)

This invention relates to the preparation of catalysts and pertains more particularly to the preparation of catalysts for the hydrogenation of petroleum oil and other carbonaceous materials.

The present application forms a continuation-in-part of my earlier application Serial No. 204,313, filed April 26, 1938.

It has heretofore been proposed to prepare hydrogenating catalysts by coating or impregnating a porous carrier with an active hydrogenating catalyst, such as, for example, the oxides or sulphides of the metals of group VI of the periodic system and particularly the oxides or sulphides of tungsten and molybdenum. Various types of carriers having a porous or capillary structure such as adsorptive clays, activated carbon, silica gel, kaolin, kieselguhr and others have been suggested.

This invention finds particular application to the preparation of hydrogenating or dehydrogenating catalysts comprising a support such as adsorptive clay impregnated with a tungstate or molybdate salt solution.

In accordance with present practices, the catalyst is prepared by impregnating the carrier with a dilute solution of ammonium thiotungstate or ammonium thiomolybdate.

According to previous practices, the ammonium thiotungstate, for example, was prepared by reacting tungstic oxide ($WO_3$) with ammonium sulphide solution through which an excess of hydrogen sulphide was passed so that all of the tungstic oxide was converted to ammonium thiotungstate. When operating in this manner, solubility of the ammonuim thiotungstate in the ammonium sulphide solution is relatively low, amounting to from 45 grams to 70 grams per liter calculated as tungstic oxide ($WO_3$). In view of the low solubility of this material, it was heretofore necessary to employ weak impregnating solutions, and to build up the necessary concentration of the tungstic oxide or sulphide it was necessary to form a thin slurry of catalyst solution and carrier which had to be dried before molding. Following the molding operation, it was necessary to further dry the molded product in the absence of air and to subject the product to a reducing treatment before use.

The present invention is dircted to an improvement in the process of preparing a catalyst of the general nature above outlined.

One of the principal objects of the invention is to provide an improved process which is more simple in that it requires fewer procedural steps and as a consequence the expense of preparation is reduced.

Another object of the invention is to produce a hydrogenating catalyst having a higher efficiency than catalysts of similar type heretofore produced.

Other objects and advantages of the invention will be apparent from the more detailed description hereinafter.

I have found that the above and other objects may be attained by following the process hereinafter described.

In accordance with the broader phase of the present invention, a tungstate or molybdate solution is first prepared as hereinafter described in a more highly concentrated form so that the amount of tungsten and molybdenum present in the final catalyst can be obtained by directly admixing the solution and carrier to form a plastic mass suitable for molding without intermediate drying treatment. The resulting product can be air dried without igniting and may be charged directly into the reactor.

I have found that the catalyst formed in this manner is not only less expensive to produce but has a higher efficiency than catalysts prepared according to previous methods.

For illustrative purposes the preparation of a hydrogenating catalyst comprising tungsten polysulphide or oxysulphide supported on acid treated adsorptive clay will be described in detail as the preferred embodiment, it being understood that the invention in some of its broader concepts is not so limited.

In accordance with the more specific details of the invention, an adsorptive clay which is naturally active, such as fuller's earth or an adsorptive clay which has been activated by suitable treatment, such as with acid, for example, activated clays marketed under the trade name of Super Filtrol, Terrana, Tonsil, or Marcil, is first treated with a dilute solution of hydrofluoric acid. This treatment is accomplished by intimately admixing the clay with the acid of about 8% concentration for a period of about 20 minutes. The product is thereafter thoroughly dried by passing through a Herreschoff type furnace wherein it is heated to a temperature of 220° F. to about 320° F.

This product, after being granulated, forms the carrier or support for the active catalyst.

The product so produced is then impregnated with a solution prepared as follows: Tungsten trioxide is digested in an ammonium sulphide solution, the amount of sulphide present being insufficient to completely convert the trioxide into ammonium thiotungstate. As a result, the product is not pure ammonium thiotungstate but contains some ammonium tungstate and some intermediate partially sulphided compounds, such as $(NH_4)_2WO_2S_2$. The solubility of the resulting product is much higher than pure ammonium thiotungstate. The solution, for example, may contain from about 100 to 250 grams of tungsten, determined as tungsten trioxide, per liter of solution.

The relative proportions of clay and solution employed may be of the order of from about a quarter to three quarters liter of solution for each kilogram of clay used. The resulting product will contain from about 1% to 10% tungsten.

The mixed product is then granulated by passing through a screen and molded into pellets of desired size either by pilling or extrusion. If desired, a small amount of graphite or other lubricant may be incorporated into the mixture to facilitate extrusion. The product so formed may be used directly as a hydrogenating catalyst. In some cases, it may be desirable to subject the catalyst to a sulphidizing treatment either prior to or following the forming of the mixture into pellets. Such sulphidizing treatment may comprise, for example, heating it in a hydrogen sulphide atmosphere at a temperature of 700° F. for a period of about six hours. This treatment is preferably accomplished after the catalyst is charged to the reactor. Ammonium thiomolybdate may be used as a substitute for the tungstate.

As a guide for carrying out the invention to obtain the best results therefrom, the following specific example may prove helpful.

*Example*

3938 grams of tungsten trioxide ($WO_3$) were dissolved in 17.5 liters of ammonium sulphide solution prepared by reacting a 6.4% solution of $NH_3$ with $H_2S$ at room temperature and atmospheric pressure. To insure complete solution, the mixture was agitated for 1 hour at 160° F. The resulting product had a specific gravity of 1.206 at 90° F. and contained 225 grams per liter of tungsten expressed as $WO_3$. This product, as previously described, is not a solution of pure ammonium thiotungstate but contains some ammonium tungstate and intermediate oxy-sulphide compounds since pure ammonium thiotungstate is soluble only to the extent of from 40 to 70 grams per liter of solution.

4.160 liters of the solution so formed was combined with 10 kilograms of activated clay known under the trade name of Super Filtrol which had previously been subjected to hydrofluoric acid treatment for 20 minutes and subsequently dried at a temperature of 260° F. The mixture was thoroughly agitated. A small amount of hydrogen sulphide was first evolved and the mixture became a reddish-brown in color with the evolution of a small amount of heat. As the mixing continued the color changed to black, then to gray and finally to a yellowish-white. It appeared that some oxidation took place although no evolution of $SO_2$ was observed. It was concluded that any oxidation which might have occurred resulted in the formation of oxy-sulphide complexes or the $SO_2$ became adsorbed by the clay.

The mixture was then granulated through a 12 mesh screen. The granulated product appeared dry and exhibited no tendency to pack or become lumpy.

The product was then formed into small pills of about 1 centimeter in diameter and two centimeters in length.

To determine the hydrogenating efficiency, the product was placed in a hydrogenation chamber through which a mixture of 38.4° A. P. I. gravity kerosene was passed through while under a pressure of 3000 pounds per square inch, in which the amount of hydrogen amounted to about 12,000 cubic feet of hydrogen per barrel of oil. The hydrogenating chamber was maintained at an average temperature of 698° F. The oil was passed through the chamber at the rate of 1130 barrels per day. The resulting product had an A. P. I. gravity of 58.4°.

Another catalyst of the same composition prepared according to the wet process forming the conventional method of preparation when operating to produce the same quality of final product, namely, A. P. I. gravity of 58.4° under slightly higher temperature conditions, required an average feed rate of 1020 barrels per day. These comparative tests show that the catalyst prepared according to the present invention under the same temperature conditions permits a greater through-put. Conversely, when maintaining the same through-put the catalyst prepared according to the present invention would permit lower operating temperature.

Having described the preferred embodiment of the invention and given specific examples thereof, it will be understood that it embraces such other modifications and variations as come within the spirit and scope thereof.

I claim:

1. A method of preparing a hydrogenating catalyst comprising a group VI metal compound of the class consisting of tungsten and molybdenum which comprises reacting one of the class consisting of tungstic and molybdic oxide with ammonium sulphide, the amount of sulphide being insufficient to completely convert said oxide to the corresponding ammonium thio salt whereby the reaction product contains a mixture of the oxygen and sulphur compounds of molybdenum or tungsten, mixing the reaction solution with an adsorbent supporting material, controlling the concentration of the solution and the amount of adsorbent material used to form a plastic mass suitable for molding without intermediate drying, and molding the resulting product into units of uniform size.

2. A method of preparing a hydrogenating catalyst comprising a group VI metal compound of the class consisting of molybdenum and tungsten which comprises forming a solution containing a mixture of the thio salt and normal salt of the said metal having a concentration of the metal compound calculated as trioxide of at least 200 grams per liter, mixing with said solution an adsorbent carrier in an amount sufficient to form a plastic mass suitable for molding without prior drying treatment, and thereafter molding the resulting product.

3. In the method defined by claim 2, the further improvement which comprises forming with ammonium sulphide a solution containing ammonium thiotungstate and ammonium tungstate and admixing said solution with a carrier.

4. In the method defined by claim 2, the further improvement which comprises employing hydrofluoric acid treated bentonite clay as a carrier which is admixed with said solution.

5. In the method defined by claim 2, the further improvement which comprises forming with ammonium sulphide a solution containing ammonium thiotungstate and ammonium tungstate and admixing said solution with a bentonite clay as a carrier.

RHEA WATTS.